United States Patent
Sun et al.

(10) Patent No.: US 9,403,166 B2
(45) Date of Patent: Aug. 2, 2016

(54) OATS PROCESSING EQUIPMENT AND METHOD

(71) Applicant: Inner Mongolia Sanzhuliang Natural Oats Industry Corporation, Hohhot (CN)

(72) Inventors: Zuobang Sun, Hohhot (CN); Zhi Sun, Hohhot (CN); Wei Wang, Hohhot (CN)

(73) Assignee: Inner Mongolia Sanzhuliang Natural Oats Industry Corporation, Hohhot (CN)

( * ) Notice: Subject to any disclaimer, the term of this patent is extended or adjusted under 35 U.S.C. 154(b) by 461 days.

(21) Appl. No.: 13/994,272

(22) PCT Filed: Oct. 26, 2012

(86) PCT No.: PCT/CN2012/083629
§ 371 (c)(1),
(2) Date: Jun. 14, 2013

(87) PCT Pub. No.: WO2014/059695
PCT Pub. Date: Apr. 24, 2014

(65) Prior Publication Data
US 2014/0331606 A1 Nov. 13, 2014

(30) Foreign Application Priority Data
Oct. 18, 2012 (CN) .......................... 2012 1 0397367

(51) Int. Cl.
*B02C 23/10* (2006.01)
*B02B 5/02* (2006.01)
*B02B 3/00* (2006.01)
*A23L 1/10* (2006.01)
*B02C 9/04* (2006.01)
*B65B 1/30* (2006.01)

(52) U.S. Cl.
CPC ................. *B02B 5/02* (2013.01); *A23L 1/1041* (2013.01); *B02B 3/00* (2013.01); *B02C 9/04* (2013.01); *B02C 23/10* (2013.01); *B65B 1/30* (2013.01); *A23V 2002/00* (2013.01)

(58) Field of Classification Search
CPC .......... B02B 5/02; B02B 3/00; A23L 1/1041; B02C 9/04; B02C 23/10; B65B 1/30
USPC ...................................................... 241/6–13
See application file for complete search history.

(56) References Cited

FOREIGN PATENT DOCUMENTS

| CN | 86104448 | 4/1987 |
|---|---|---|
| CN | 1883809 | 12/2006 |
| CN | 101396671 | 4/2009 |
| CN | 101486005 | 7/2009 |
| CN | 201427056 | 3/2010 |
| CN | 102553668 | 7/2012 |

*Primary Examiner* — Mark Rosenbaum
(74) *Attorney, Agent, or Firm* — Harness, Dickey & Pierce, P.L.C.

(57) ABSTRACT

An oats processing equipment comprises at least two groups of awners and at least two groups of oat grinders, with awners within the same group being connected in parallel or in series, and oat grinders within the same group being connected in parallel or in series, preferably 3 to 4 groups of awners and oat grinders are included. An oat processing method comprises steps of: (S00) classifying oats subjected to surface processing according to grain sizes; (S10) feeding oats of a certain class into a plurality of groups of awners for more than two stages of awn removing; and (S20) feeding the oats subjected to the awn removing into a plurality of groups of oat grinders for more than three stages of grinding. The inputted load of a single awner and an oat grinder is limited, thus achieving the technical effect of grinding oats gently and separating the oats finely.

7 Claims, 1 Drawing Sheet

OATS PROCESSING EQUIPMENT AND METHOD

TECHNICAL FIELD

The present application relates to an oats processing equipment, and more particularly, to an oats processing equipment with a daily oats processing capacity over 0.1 million tons of oats. The oats processing equipment includes an increased number of processing modules, to reduce the throughput and work load of a single processing module, thus achieving a technical effect of grinding the oats gently and separating the oats finely.

The present application also relates to a method for processing oats, in which oats are classified by their grain sizes after surface treatment, so that oats in different classes can be processed separately; further, a limitation is applied to the input and the load of each awner and oat grinder, thus achieving a technical effect of grinding oats gently and separating oats finely.

TECHNICAL BACKGROUND

Oats are low-sugar, high-nutrition and high-energy food. Fine processing of oats obtains oat groats or oat flakes which are convenient for eating and taste better, and have been popular as health-care food. Dietary fiber in oats has various biological functions such as to reduce low-density lipoprotein of triglyceride, facilitate cholesterol excretion, prevent diabetes mellitus, decrease the risk of blood vessel complications, and purge and clean the intestines, which is helpful for patients suffered from habitual constipation. Oats contain a low caloric content and are helpful for a slimming effect. Furthermore, oats contain abundant Vitamin B1, B2, E and folate, which are beneficial to blood circulation. Mineral substances contained in oats, such as calcium, phosphorus, iron, zinc and manganese, are beneficial to prevent osteoporosis and anemia and promote wound healing. Therefore, the market of oats is expanded increasingly.

Oats contain inner soft grains, which are enclosed by hard hulls with awns. In processing a large amount of oats, especially more than 0.1 million tons of oats every day in the prior art, a large amount of oats are simultaneously inputted into an awner to for awn removing, and then into an oat grinder for further processing. Oats are subjected to strong squeezes and collisions by the awner due to the large amount of the oats, thus grains are susceptibly broken and crushed due to the squeezes and collisions, which degrades the whole-grain yield and quality of the products.

In view of the above, there is a need for an improved oats processing equipment for processing a large amount of oats, and the squeezes and collisions suffered by the oats grains in the process, as well as the break and crush rate due to the collisions, are reduced to improve the whole-grain yield and the quality of the products.

SUMMARY OF THE INVENTION

The present invention provides an oats processing equipment, which solves the problem that oats grains are easily broken and crushed due to the suffered squeezes and collisions when a daily processing amount over 0.1 million tons of oats are processed.

The present invention further provides an oats processing method which includes classifying oats subjected to surface processing according to their grain sizes, so that oats of different classes can be respectively processed, and the inputted load of each awner and oat grinder is limited, thus ensuring a good effect of grinding oats gently and separating oats finely.

The present invention discloses a technical solution as follow.

An oats processing equipment, includes at least two groups of awners and at least two groups of oat grinders. Awners within the same group are connected in parallel or in series, and oat grinders within the same group are connected in parallel or in series.

Preferably, two groups of awners are provided.

Preferably, each group of awners includes four awners connected in parallel.

Preferably, three to four groups of oat grinders are provided.

Preferably, a bran brushing device is provided adapted for a bran brushing process on oats is provided following the last oat grinder.

Preferably, a vibrating screen adapted for classifying oat grains based on grain sizes and a winnowing device adapted for collecting light glutens are provided following the bran brushing device.

Preferably, a packager is provided for packaging the processed oats, and a photoelectric detector is arranged to detect the quality of the oats.

An oats processing method includes steps of:

S00: classifying oats subjected to surface processing according to their grain sizes;

S10: feeding the oats of a certain class into a plurality of groups of awners for more than two stages of awn removing; and S20: feeding the oats subjected to the awn removing into a plurality of groups of oat grinders for more than three stages of grinding.

Preferably, the method further includes a step of: performing a bran brushing process on the oats outputted by the oat grinders.

Preferably, the method further includes a step of: conducting a photoelectric detection before or after a process of packaging the oats.

The advantageous effect of the present invention lies in that: the groups and numbers of awners and oat grinders are increased on the base of an original oats hulling technology; more than hundreds of thousands of tons oats, the surfaces of which have been processed, are classified in grain sizes to make oats in each grain size are respectively processed in different groups of awners and oat grinders, and the flow and the load of a single awner and an oat grinder are fixed, to reduce the work load of a single machine, thus achieving the technical effect of grinding oats gently and separating the oats finely.

With such a solution including 3 to 4 groups of awners and oat grinders, device investments are not significantly increased, but the squeezes and collisions suffered by the oats, as well as the break and crush rate due to the squeezes and collisions, are greatly reduced, so that the whole-grain yield and the quality of the products is improved.

Further, each of the awners within the same group may be operated and controlled selectively and separately depending on characters of raw oats, to remove the oats awns. Since the outermost hulls of oats have no edible value, but the inner cortexes portions of oats have a great edible value, the removed outermost hulls are not further processed, but oats glutens extracted in the oat grinders are collected.

A bran brushing device is arranged following the last oat grinder and before the colorsorter, oats grains obtained by gently grinding and finely separating and output by the oat grinder are input to the bran brushing device, and glutens adhered to the oat grains are physically brushed by the bran brushing device, to ensure clean surfaces of the oat grains, for a better color sorting effect. A vibrating screen and a winnowing device are provided following the bran brushing device. Here, the vibrating screen may be equipped with different screen plates to classify the oat grains without hulls and awns according to their grain sizes, and the winnowing device collects light glutens by means of a centrifugal fan and a dust collecting and discharging system.

A photoelectric detector is provided before or after the packaging process, to verify quality indexes such as a pesticide content, a chemical fertilizer content and a heavy metal content in the final product. If a certain index is not satisfying, the corresponding batch of products can be traced back.

Figure 1:
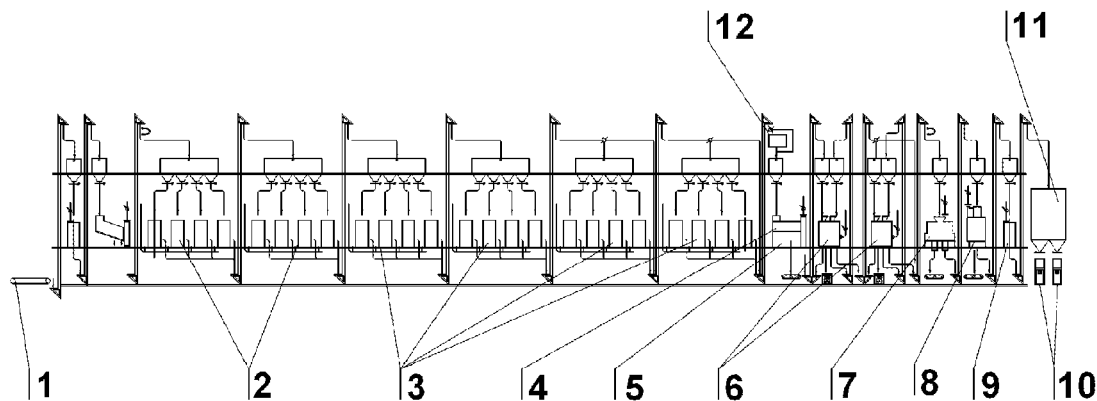
FIG. 1 is a structural diagram of an oats processing equipment according to an embodiment of the invention.

List of reference numeral:

| | | |
|---|---|---|
| 1: Conveyor; | 2: Awner; | 3: Oat grinder; |
| 4: Vibrating screen; | 5: Winnowing device; | 6: Colorsorter; |
| 7: Classifying screen; | 8: Grain separator, | 9: Flow scale; |
| 10: Packager; | 11: Product storehouse; | 12: Bran brushing device. |

DETAILED DESCRIPTION OF PREFERRED EMBODIMENTS

The technical solution of the present application is further explained by a specific embodiment in conjunction with the drawing.

FIG. 1 is a structural diagram of an oats processing equipment of an embodiment of the present application. In this embodiment, as shown in FIG. 1, the oats processing equipment includes two groups of awners 2 connected in parallel to remove oats awns, with each group including four awners 2 connected in series. The oats are processed by the first group of awners 2 for the first stage of awn removing, and then processed by the second group of awners 2 for the second stage of awn removing. The second group of awners 2 is followed by four groups of oat grinders 3 connected in series, with each group including four oat grinders 3 connected in parallel. Since the groups and total numbers of the awners 2 and the oat grinders 3 are increased with respect to the existing oats hulling technology, in the case of processing a large amount of oats, especially more than 0.1 million tons of oats, the oats after surface treatment are further classified according to their grain sizes, so that oats in different classes can be processed in different groups of awners and oat grinders. Further, the input to each awner 2 and oat grinder 3 is limited, not to overload the awner 2 and the oat grinder 3, thus achieving a technical effect of grinding oats gently and separating oats finely.

In this embodiment, it is also possible to provide 3 or 4 groups of awners, with each group including 4 awners connected in parallel, and 3 or 4 groups of oat grinders, with each group including four oat grinders 3 connected in parallel. Such a solution does not significantly increase device investments, but greatly reduces the squeezes and collisions suffered by the oats, as well as the break and crush rate due to the squeezes and collisions, so that the whole grain yield and the quality of the products is improved. In addition, each of the four awners 2 within the same group may be operated and controlled selectively and separately depending on characters of raw oats, to remove the oats awns. Since the outermost hulls of oats have no edible value, but the inner cortexes portions of oats have a great edible value, the removed outermost hulls are not further processed, but oats glutens extracted in the oat grinders are collected.

A bran brushing device 12 for a bran brushing process is provided after the last oat grinder 3 and before a colorsorter 6. Before entering into the colorsorter 6, oats grains obtained by gently grinding and finely separating and output by the last oat grinder 3 are input to the bran brushing device 12, and glutens adhered to the oat grains are physically brushed by the bran brushing device 12, to ensure clean surfaces of the oat grains, for a better color sorting effect.

A vibrating screen 4 and a winnowing device 5 are provided following the bran brushing device 12. Here, the vibrating screen 4 may be equipped with different screen plates to classify the oat grains without hulls and awns according to their grain sizes, and the winnowing device 5 collects light glutens by means of a centrifugal fan and a dust collecting and discharging system.

Colorsorters 6, a classifying screen 7, a grain separator 8, a flow scale 9, a product storehouse 11 and a packager 10 are provided subsequently following the winnowing device 5. After the color sorting by the colorsorters 6, screening by the classifying screens 7 and grain separating by the grain separator 8, oat grains are scaled by the flow scale 9 and inputted to the product storehouse 11, and then packaged by the packager 10. A photoelectric detector is arranged before or after the packaging process to verify quality indexes such as a pesticide content, a chemical fertilizer content and a heavy metal content in the final product. If a certain index is not satisfying, the corresponding batch of products can be traced back.

Figure 2:
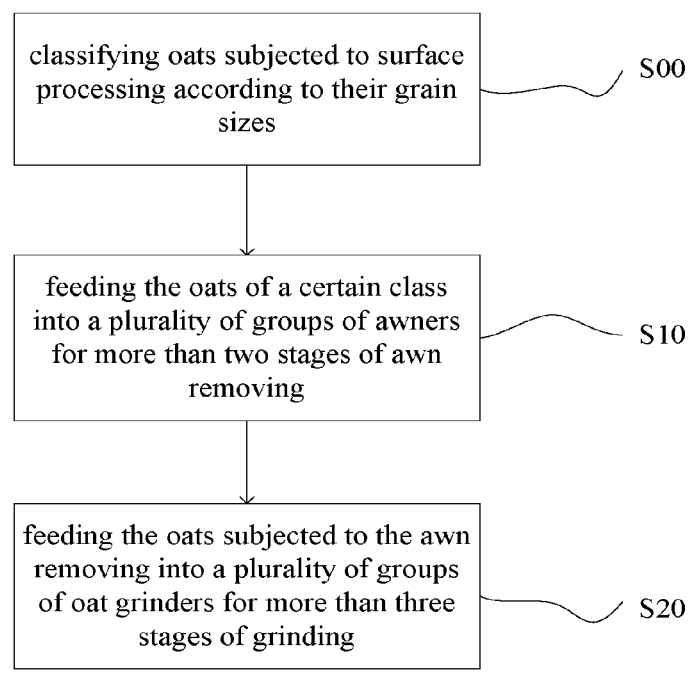
FIG. 2 is a flowchart of an oats processing method according to an embodiment of the application.

FIG. 2 is a flowchart of an oats processing method according to an embodiment of the present application. As illustrated in FIG. 2, the method includes Steps S00, S10 and S20.

At Step S00, oats subjected to surface processing are classified according to their grain sizes.

At Step S10, a conveyor 1 is used for feeding oats of a certain class into a first group of awners 1 for the first stage of awn removing, and then into a second group of awners 1 for the second stage of awn removing. More preferably, the oats can be fed into more than two groups of awners 2 sequentially for more than two stages of awn removing.

At Step S20, oats subjected to the awn removing are fed into the oat grinders 3, preferably into four groups of oat grinders 3 for processing. More preferably, the oats subjected to the awn removing can be processed in more than four groups of oat grinders 3, respectively.

Since oats in different classes are respectively processed in different awners 2 and oat grinders 3, and the inputted load of each awner 2 and oat grinder 3 is limited, so that the squeezes and collisions suffered by the oats grains in the processing are reduced, hence the break and crush rate due to the collisions is reduced significantly to improve the whole grain yield and the quality of the products.

The oats outputted by the oat grinders 3 are fed into a bran brushing device 12 to undergo a bran brushing process. Oats grains obtained by gently grinding and finely separating and output by the oat grinder 3 are input to the bran brushing device 12, and glutens adhered to the oat grains are physically brushed by the bran brushing device 12, to ensure clean surfaces of the oat grains, for a better color sorting effect. A vibrating screen 4 and a winnowing device 5 are provided following the bran brushing device 12. Here, the vibrating screen 4 may be equipped with different screen plates to classify the oat grains without hulls and awns according to their grain sizes, and the winnowing device 5 collects light glutens by means of a centrifugal fan and a dust collecting and discharging system.

Quality monitoring is conducted by a photoelectric detector arranged before or after the packaging process, to verify quality indexes such as a pesticide content, a chemical fertilizer content and a heavy metal content in the final product. If a certain index is not satisfying, the corresponding batch of products can be traced back.

Furthermore, in the oat processing method of the present application, food safety control is enhanced in that each batch of oats after preliminary examination undergoes an improved cleaning step before it is processed by the grinding process.

The oats processing equipment and method of the present application are especially suitable for processing naked oats, in particular the case of a daily oats processing capacity over 0.1 million tons of oats.

The invention has been described above in conjunction with the specific embodiment. Such description is only used for explaining the invention, rather than being interpreted as limiting the scope of the invention in any way. Moreover, other specific embodiments of the invention may be made by those skilled in the art based on the explanation herein without creative work, and all these embodiments will fall into the scope of the invention.

The invention claimed is:

1. An oats processing equipment, comprising:
   three or four groups of awners; and
   three or four groups of oat grinders, wherein each group of awners includes four awners connected in parallel, and oat grinders within the same group are connected in parallel or in series.

2. The equipment of claim 1, wherein, a bran brushing device adapted for a bran brushing process on oats is provided following the last oat grinder.

3. The equipment of claim 2, wherein, a vibrating screen adapted for classifying oat grains based on grain sizes and a winnowing device adapted for collecting light glutens are provided following the bran brushing device.

4. The equipment of claim 1, wherein, a packager is provided for packaging the processed oats, and a photoelectric detector is arranged to detect the quality of the oats.

5. A method of using an oats processing equipment comprising three or four groups of awners and three or four groups of oat grinders, wherein each group of awners includes four awners connected in parallel, and oat grinders within the same group are connected in parallel or in series, the method comprising:
   classifying oats subjected to surface processing according to their grain sizes;
   feeding the oats of a certain class into the three or four groups of awners for more than two stages of awn removing; and
   feeding the oats subjected to the awn removing into the three or four groups of oat grinders for more than three stages of grinding.

6. The method of claim 5, further comprising: performing a bran brushing process on the oats outputted by the oat grinders.

7. The method of claim 5, further comprising: conducting a photoelectric detection before or after a process of packaging the oats.

\* \* \* \* \*